Dec. 20, 1927.
R. G. GREEN
GAUGE
Filed Dec. 30, 1921
1,653,168
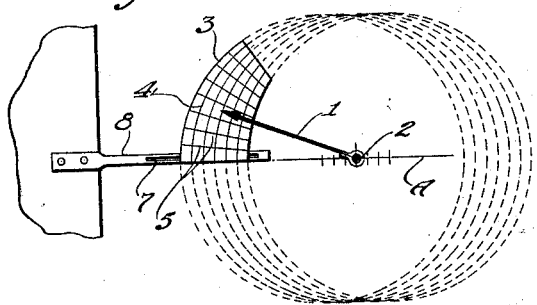
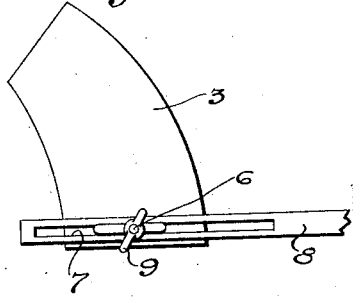
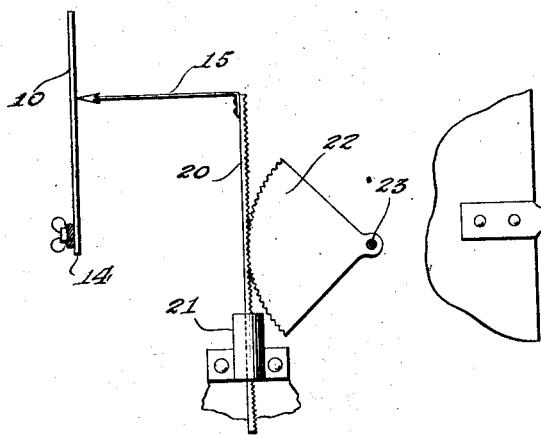
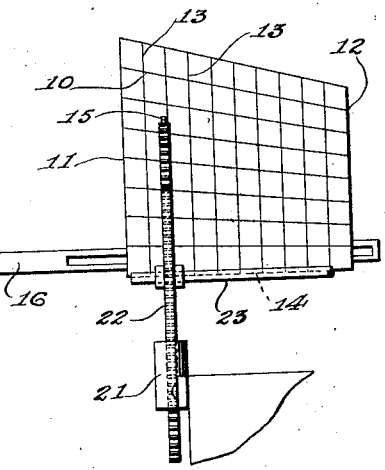
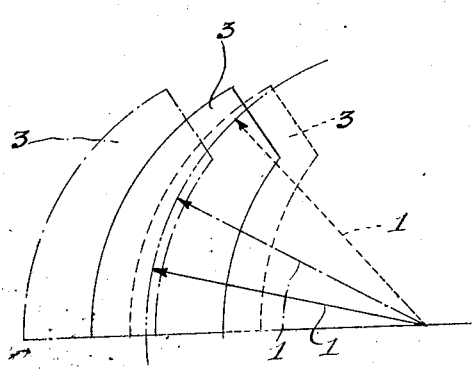
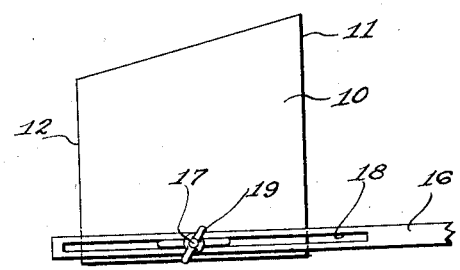
Robert G. Green
INVENTOR
BY *Victor J. Evans*
ATTORNEY Patented Dec. 20, 1927.

1,653,168

UNITED STATES PATENT OFFICE.

ROBERT GLADDING GREEN, OF MINNEAPOLIS, MINNESOTA.

GAUGE.

Application filed December 30, 1921. Serial No. 525,902.

This invention relates to gauges or an adjustable scale designed for measuring forces and utilizing in combination with the scale a torsion wire for measuring the force.

It is a physical law that the torsion produced in a stretched wire is proportional to the force producing the torsion.

In the present invention this principle has been made use of in the construction of an apparatus with which the magnitude of a force can be determined by measuring the torsion it produces in a stretched wire, the amount of torsion being indicated upon a scale by a pointer which is movable by the wire. In an apparatus where a fixed non-adjustable scale is employed which has a degree for the unit scale, the determination of the value of any unknown force is based upon a calculation in proportion of a known force and a measured deflection of the pointer which furnishes a known ratio.

An object of the present invention is to provide a movable adjustable scale by means of which the magnitude of a force producing torsion of a wire will be indicated directly in units of force or weight without requiring any mathematical calculations and further to provide a scale adapted for cooperation with a wire operated pointer, which scale has a plurality of units of various sizes arranged in series thereon and further to provide a scale which is adjustable so that the units of the exact size needed can be moved under the end of the torsion wire operated pointer.

Frequently variations, due to manufacture, in the dimensions and quality of a given type of wire occur, and the adjustability of the scale will compensate for such variations which adjustability will also compensate for changes in the torsion constant of the wire due to over stretching or excessive use.

Other objects of the invention will appear in the following detailed description taken in connection with the accompanying drawings wherein:

Fig. 1 is a side elevation of the preferred form of the improved gauge.

Fig. 2 is a rear view of the scale structure.

Fig. 3 is a side elevation of a modified form of the gauge or measuring instrument.

Fig. 4 is a front elevation of the modified form.

Fig. 5 is a rear elevation of the modified form.

Fig. 6 is a diagrammatic view illustrating the effect of the adjustability of the scale relative to the torsion wire operated pointer.

Referring more particularly to the drawings, the type of instrument illustrated in Figs. 1 and 2 embodies a pointer 1 which is fixed to stretched torsion wire 2 in any suitable manner for movement with the wire upon the application of force to the wire for producing torsion therein. The torsion produced in the wire, is utilized for measuring the force applying the torsion through the medium of the pointer 1 and the scale 3. The scale 3 is shown as a curved quadrilateral the measuring units on its face being formed by series 4 of segments of circles which are of equal diameters and the radii of each are equal to the length of the pointer 1. In forming the series of segments of circles 4 the centers of the circles lie in a straight line and the centers are spaced equal distances one from the other along the side line as indicated at A. Cross lines divide each circle segment into an equal number of parts or units as indicated at 5 so that each circle segment represents a different length arc but each represents the same number of units. The scale plate 3 has a threaded stud 6 attached to its rear surface which projects through a slot 7 on its supporting arm 8. A wing nut 9 is mounted upon the stud 6 for holding the scale plate 3 in adjusted position upon its support 8 for permitting adjustment of the scale plate to accommodate various conditions which may arise in the practical use of the gauge or instrument such as variations in the torsion wire, due to manufacture, varying in size or quality of the torsion of the wire, changes in the torsion constant wire due to over stretching or excessive use, changes in the apparent torsion value of a wire due to accessories or attachments thereto, such as variations in the weight of the pointers etc.

The adjustment of the quadrilateral scale is indicated diagrammatically in Fig. 6 of the drawings showing the different positions of the scale relative to the pointer 1 under various adjustments of the scale as required and showng how under such adjustments of the scale the pointer 1 will co-operate with different units of different circle segments on the scale.

In Figs. 3 to 5 of the drawings a modified form of the invention is shown in which a trapezoidal scale plate 10 is used. In marking the measuring units on the trapezoidal scale plate 10, the parallel sides or edges 11 and 12 are divided into an equal number of parts and lines are drawn connecting the corresponding points on each edge as clearly shown in Fig. 4 of the drawings. A series of vertical lines 13 are then drawn that being determined by dividing the base 14 of the trapezoidal scale plate into a number of parts of equal size. The vertical lines 13 at the outer border of the plate 10 then represent a number of units of large magnitude and the vertical lines near the short side of the scale represent an equal number of units of small magnitude. Units of the desired magnitude are brought into active co-operation with the pointer 15 by adjusted movement of the scale plate 10 on its support 16. The scale plate 10 has a threaded stud 17 carried thereby which extends through a slot 18 on the support 16 and which has a wing nut 19 mounted thereon by means of which the scale is held in adjusted positions. When using the trapezoidal scale plate the pointer 15 is attached to a vertically movable rack 20 which is in turn supported by a suitable guide 21 of any approved construction. A segmental gear 22 meshes with the rack 20 and is mounted upon the torsion wire 23 so that torsion of the wire upon the application of force thereto will rotate the gear segment 22 and move the rack 20 for moving the pointer 15 over the scale plate 10.

While in the foregoing description and in the drawings the scale plates 3 and 10 are shown as mounted for lateral movement it is to be understood that they may also be mounted for vertical adjusted movement if desired without departing from the spirit of this invention and it will further be noted from the foregoing description and the drawings that wires of various sizes and quality may be used for the torsion wire the degree of variation possible being determined by the proportions of the scale plates and also that the adjustability of the scale plates provides an instrument for measuring force through the proportion of torsion generated thereby upon a stretched wire, which instrument has great flexibility of adjustment to accommodate various conditions which might arise during such measuring operations.

It is, of course, to be understood that the invention may be constructed in other manners and the parts associated in other manners and, therefore, I do not desire to be limited in any manner except as set forth in the claims hereunto appended.

Having thus described my invention what I claim is:

1. In a device as set forth, a supporting bar provided with a longitudinal slot, a scale plate, a stud carried by said scale plate and extending into said slot, means carried by said stud for clamping engagement with said bar to hold said scale plate in adjusted positions, said scale plate having one surface divided into a plurality of units in rows of equal number, and a pointer cooperating with said scale plate.

2. In a device as set forth, a trapezoidal scale plate having one surface divided into a plurality of units in rows of equal number, a pointer cooperating with said scale, a rack connected to said pointer for operating the pointer, and means adapted to be operated by a torsion wire for moving said rack.

3. In a device as set forth, a trapezoidal scale plate having one surface divided into a plurality of units in rows of equal number, a pointer cooperating with said scale, a rack connected to said pointer for operating the pointer, and means adapted to be operated by a torsion wire for moving said rack, and means adjustably supporting said scale plate.

4. In a device as set forth, a trapezoidal scale plate having a plurality of measuring units thereon, a torsion wire operated segmental gear, a rack meshing with said segmental gear, and a pointer carried by said rack and cooperating with said scale.

5. In a device as set forth, a trapezoidal scale plate having a plurality of measuring units thereon, a torsion wire operated segmental gear, a rack meshing with said segmental gear, and a pointer carried by said rack and cooperating with said scale, and means for adjustably supporting said scale.

6. In a device as set forth, a trapezoidal scale plate having a plurality of measuring units thereon, a torsion wire operated segmental gear, a rack meshing with said segmental gear, and a pointer carried by said rack and cooperating with said scale, said scale plate mounted for movement parallel or at right angles to the length of the torsion wire to which said segmental gear is connected, and means for holding said scale plate in adjusted positions.

7. In a device as set forth, a scale member, a pointer cooperable with the scale member, the scale member bearing thereon a plurality of sets of units, the scale member being adjustable to bring different unit sets into position with relation to the pointer for indication thereby, and the scale member having lines arranged so that, upon each of the various adjustments of the scale, one of the lines assumes a position substantially parallel and adjacent to the longitudinal axis of the pointer to facilitate adjustment and reading.

In testimony whereof I affix my signature.

ROBERT GLADDING GREEN.